United States Patent
Stadler

(10) Patent No.: US 11,479,922 B2
(45) Date of Patent: Oct. 25, 2022

(54) TRACK MAINTENANCE MACHINE FOR COMPACTION OF BALLAST

(71) Applicant: PLASSER & THEURER EXPORT VON BAHNBAUMASCHINEN GESELLSCHAFT M.B.H., Vienna (AT)

(72) Inventor: Lothar Stadler, Vienna (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 295 days.

(21) Appl. No.: 16/641,762

(22) PCT Filed: Sep. 3, 2018

(86) PCT No.: PCT/EP2018/073558
§ 371 (c)(1),
(2) Date: Feb. 25, 2020

(87) PCT Pub. No.: WO2019/068400
PCT Pub. Date: Apr. 11, 2019

(65) Prior Publication Data
US 2020/0263363 A1    Aug. 20, 2020

(30) Foreign Application Priority Data
Oct. 3, 2017   (AT) .................................. A 394/2017

(51) Int. Cl.
*E01B 27/17*    (2006.01)
*E01B 27/02*    (2006.01)

(52) U.S. Cl.
CPC ............ *E01B 27/17* (2013.01); *E01B 27/028* (2013.01)

(58) Field of Classification Search
CPC ........ E01B 27/02; E01B 27/028; E01B 27/04; E01B 27/16; E01B 27/17; E01B 27/20
See application file for complete search history.

(56) References Cited

U.S. PATENT DOCUMENTS

| | | | |
|---|---|---|---|
| 3,998,165 A | 12/1976 | Jaeggi | |
| 2006/0005738 A1 | 1/2006 | Kumar | |
| 2011/0083578 A1 | 4/2011 | Sami | |
| 2019/0016348 A1 | 1/2019 | Greindl | |

FOREIGN PATENT DOCUMENTS

| CA | 2994587 A1 * | 3/2017 | ............... B60K 6/20 |
|---|---|---|---|
| DE | 2417062 A1 | 2/1976 | |
| WO | 2017050414 A1 | 4/2019 | |

* cited by examiner

*Primary Examiner* — Robert J McCarry, Jr.
(74) *Attorney, Agent, or Firm* — Laurence A. Greenberg; Werner H. Stemer; Ralph E. Locher

(57) ABSTRACT

A track maintenance machine for compaction of ballast under sleepers of a track includes a machine frame movable by undercarriages on the track and a tamping unit which includes an electric vibration drive for vibratory actuation of tamping tools. An electric intermediate circuit has an electric energy store or storage device. An electric machine is associated with at least one undercarriage and coupled for generator operation to the intermediate circuit. The electric vibration drive is coupled to the intermediate circuit for supply. In this way, braking energy is used in an optimal manner for supplying the vibration drive. A method for operation of a track maintenance machine is also provided.

12 Claims, 2 Drawing Sheets

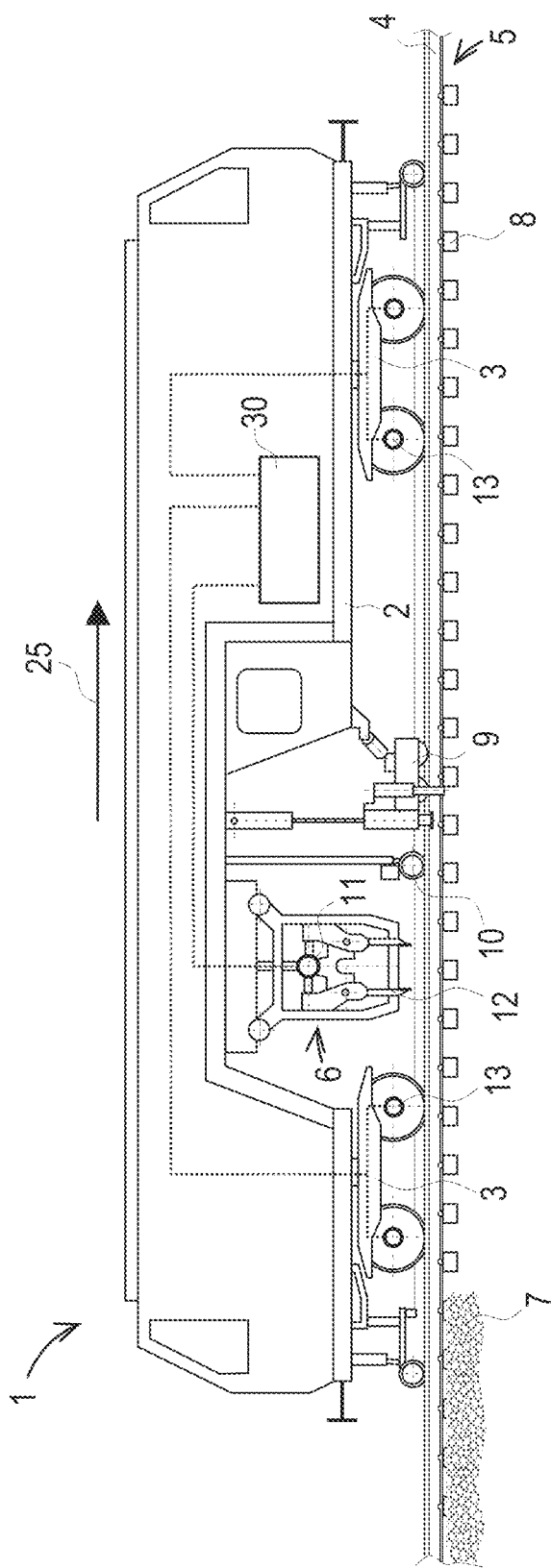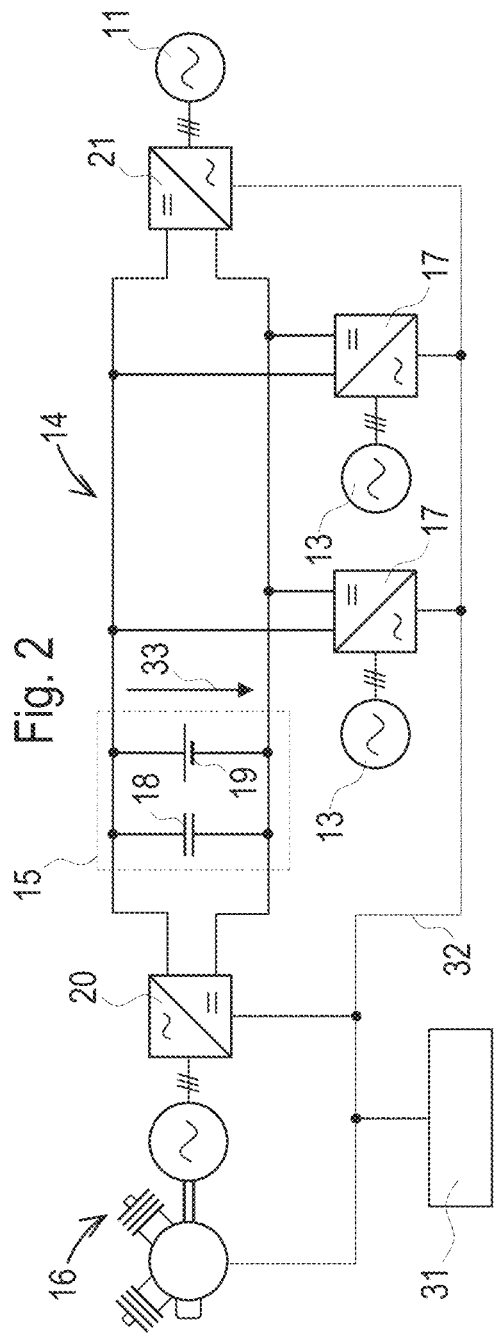

TRACK MAINTENANCE MACHINE FOR COMPACTION OF BALLAST

BACKGROUND OF THE INVENTION

Field of the Invention

The invention relates to a track maintenance machine for compaction of ballast under sleepers of a track, having a machine frame mobile by means of undercarriages on the track and a tamping unit which comprises an electric vibration drive for vibratory actuation of tamping tools. In addition, the invention relates to a method for operating the track maintenance machine.

Description of the Related Art

A track maintenance machine having a tamping unit comprising an electric vibration drive for vibratory actuation of tamping tools is known, for example, from DE 24 17 062 A1. In this, eccentric bearing bushings are arranged in pivot arms to generate vibrations. Via a chain drive, a rotary motion is transmitted to the eccentric bearing bushings by a drive shaft powered by an electric motor.

According to Austrian Patent Application A 179/2017, a tamping unit with a central vibration drive is known, wherein the vibration is transmitted to the tamping tools via squeezing cylinders. The electric vibration drive comprises an eccentric shaft which, together with a rotor of an electric motor, is supported merely in the eccenter housing. A stator of the electric motor is flange-connected to the eccenter housing with a motor housing.

SUMMARY OF THE INVENTION

It is the object of the invention to provide an improvement over the prior art for a track maintenance machine and a method of the type mentioned at the beginning.

According to the invention, this object is achieved by way of a track maintenance machine for compaction of ballast under sleepers of a track, having a machine frame movable by undercarriages on the track and a tamping unit including an electric vibration drive for vibratory actuation of tamping tools. Advantageous further developments of the invention become apparent from the dependent claims.

In this, an electric intermediate circuit with an electric energy store is arranged, wherein an electric machine is associated with at least one undercarriage and coupled for generator operation to the intermediate circuit, and wherein the electric vibration drive is coupled to the intermediate circuit for supply. In this way, braking energy is used in an optimal manner for supplying the vibration drive. During this, only a part of the electric energy has to be intermediately stored because the energy consumption by the vibration drive starts already during a braking procedure of the track maintenance machine.

In an advantageous embodiment of the invention, the electric energy store comprises a super capacitor. With this, a high power density can be achieved in a small space and with little weight. In addition, a super capacitor allows a quick discharge and a sufficient number of charging- and discharging cycles, thus optimally supporting the vibration drive having recurring and suddenly increasing performance peaks.

It is further useful if the electric energy store comprises an accumulator. In this manner, electric energy is intermediately stored for a longer time span. If the accumulator is suitably dimensioned, an additional supply installation (for example, a combustion engine-generator unit) can be temporarily shut off (in tunnels, for example).

A further advantageous development provides that the electric machine is designed as a motive drive and connected by means of a bidirectional converter to the intermediate circuit. In this way, the track maintenance machine is moved by means of the electric machine from sleeper to sleeper during a working run in order to carry out cyclic tamping of the sleepers.

Additionally, it is favourable if the vibration drive is connected to the intermediate circuit by means of a controlled inverter. With this, a simple and robust circuitry design is ensured.

A further improvement for increasing the stability and the energy efficiency provides that the vibration drive is designed as a brushless electric motor. A design as a torque motor with internal rotor delivers very high torque at relatively low rotation speeds, thus making a transmission gearing obsolete. The great drive moment of a torque motor enables high accelerations, wherein the resulting dynamics of the system have a positive effect on an immersion process of the tamping unit.

For efficient operation of the track maintenance machine it is advantageous if a control unit is designed for coordinated actuation of the components coupled to the intermediate circuit. In this, the control unit can also be used for other controlling tasks, for example for the actuation of squeezing drives. Favourably, the components to be actuated are connected to the control unit via a bus system.

An advantageous embodiment of the invention provides that the tamping unit is arranged on the machine frame, resulting in a cyclic working mode of the track maintenance machine. In this, the entire machine is braked at each sleeper for a tamping operation, wherein the braking energy is available for the generation of vibrations. During continuous operation, in which only a tamping satellite with the tamping unit is accelerated and braked cyclically, this usable energy is correspondingly reduced.

In order to ensure high availability of the track maintenance machine, it is useful if the intermediate circuit is coupled for additional energy supply to a combustion engine-generator unit. Then, enough energy for the vibration drive and the motive drive is available at all times in the intermediate circuit.

Alternatively or in addition, it can also be advantageous if the intermediate circuit is coupled to a converter circuitry for energy supply from a catenary of the track. This enables a pollution-free and low-noise operation of the track maintenance machine.

The method according to the invention provides that, when approaching a location of the track to be tamped, the track maintenance machine is braked by means of the electric machine while giving off electric energy to the intermediate circuit, and that during a tamping operation the vibration drive is supplied with electric energy from the intermediate circuit. Thus, an efficient operation is ensured.

In an improved method, the tamping tools are actuated with a higher vibration frequency during penetration into the ballast than during a squeezing operation. This makes possible an easier penetration into the ballast bed and thus shorter tamping cycles. Additionally, the increased vibration frequency and the reduced ballast resistance thus achieved have a favourable effect on the wear and tear of the tamping tools.

BRIEF DESCRIPTION OF THE SEVERAL VIEWS OF THE DRAWING

The invention will be described by way of example below with reference to the accompanying drawings. There is shown in a schematic manner in:
FIG. 1 a track maintenance machine
FIG. 2 a circuit design
FIG. 3 progression diagrams

DETAILED DESCRIPTION OF THE INVENTION

Figure 3:
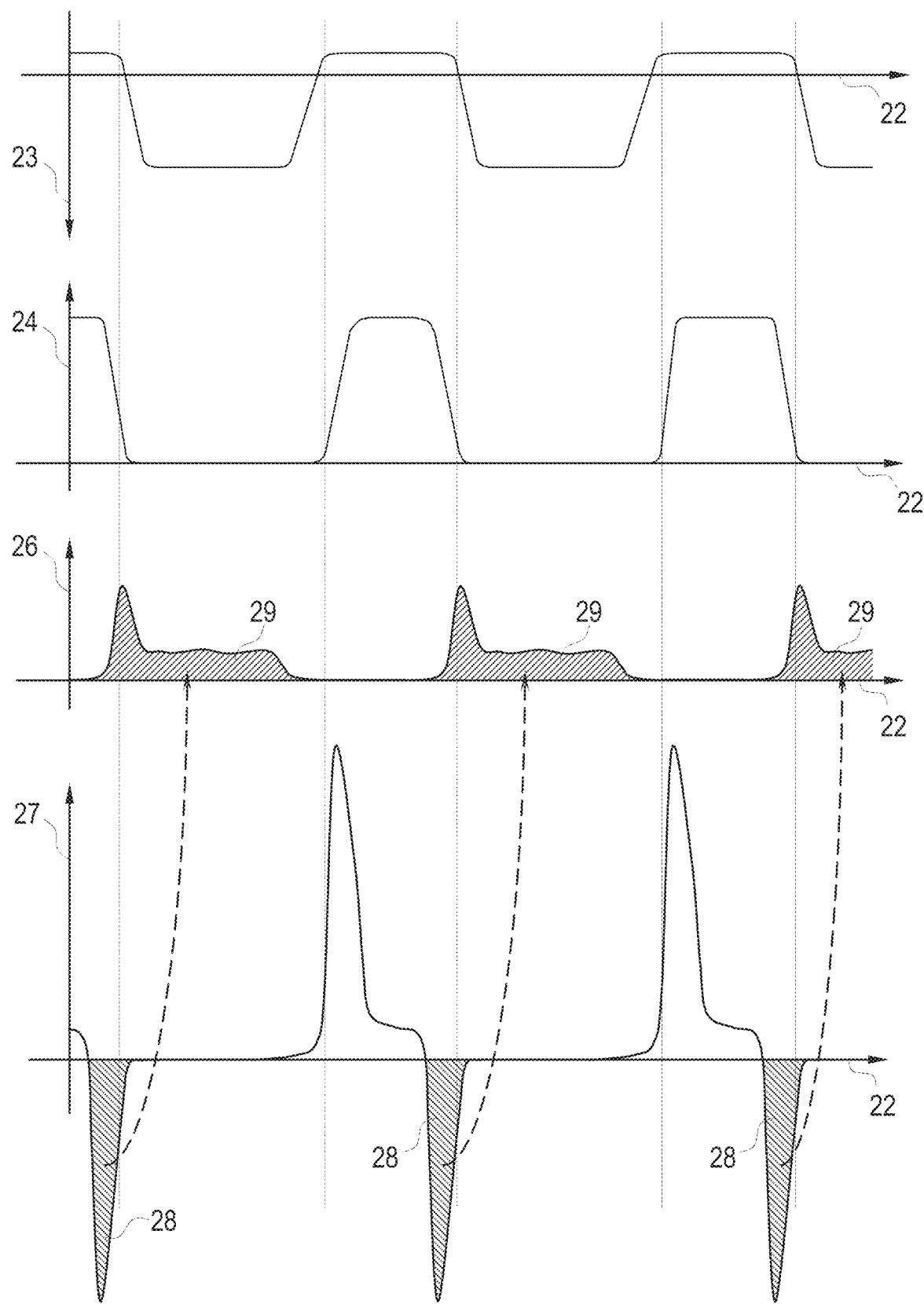

The track maintenance machine 1 shown in FIG. 1 comprises a machine frame 2 which is mobile by means of undercarriages 3 on rails 4 of a track 5. A tamping unit 6 for compaction of ballast 7 under sleepers 8 of the track 5 is arranged on the machine frame 2. Prior to a compaction operation, the track 5 is brought into a target position, specified by a measuring system 10, by means of a lifting-lining unit 9.

The tamping unit 6 comprises an electric vibration drive 11 for vibratory actuation of tamping tools 12. In addition, hydraulic drives are provided for lowering or lifting as well as for squeezing the tamping tools 12 together. Advantageously, the vibration drive 11 is built as a brushless electric motor.

The present example shows a track maintenance machine 1 with cyclic working mode, since during a working run the entire track maintenance machine 1 is moved from sleeper 8 to sleeper 8. In this, the tamping tools 12 plunge into sleeper cribs located between the sleepers 8 during a stopping phase. Alternatively, track maintenance machines 1 with continuous working mode are known where merely a so-called tamping satellite is moved cyclically. The majority of the mass of the track maintenance machine 1, however, can travel continuously along the track 5.

In any case, each tamping cycle is initiated with a braking operation in order to place the tamping unit 12 above the sleeper 8 to be tamped. To that end, at least one undercarriage 3 is equipped with an electric machine 13 which is coupled for generator operation to an electric intermediate circuit 14. When approaching a tamping location, the electric machine 13 generates a braking moment. With this, a major part of the kinetic energy of the track maintenance machine 1 or of a tamping satellite is converted to electric energy during a braking procedure and fed to the intermediate circuit 14.

According to the invention, this electric energy is used for supplying the electric vibration drive 11. This is advantageous inasmuch as the vibratory actuation of the tamping tools 12 starts already during the braking procedure, resulting in an immediately energy usage. An energy store 15 arranged in the intermediate circuit 14 thus does not need to intermediately store the entire braking energy, resulting in a lower capacity requirement.

An advantageous circuit design is shown in FIG. 2. In this, two electric machines 13 are arranged which are operable in generator operation as well as in motor operation. The respective electric machine 13 then also serves as motive drive for acceleration of the track maintenance machine 1 after a tamping operation. In this case, additional electric energy is supplied to the intermediate circuit 14, for example by means of a combustion engine-generator unit 16 or via an inverter circuitry from a catenary. Alternatively, the forward acceleration can take place by means of separate drive.

Advantageously, the respective electric machine 13 is designed as a three-phase motor and connected via a bidirectional inverter 17 to the DC intermediate circuit 14. Favourably, the energy store 15 comprises a super capacitor 18 and an accumulator 19. Additionally, a charging unit can be provided to supply the accumulator 19 with an optimal charging voltage.

The optional combustion engine-generator unit 16 is coupled via a rectifier 20 to the intermediate circuit 14. It is favourable if energy for several tamping cycles is buffered by means of the accumulator 19. Then, even with the combustion engine-generator unit 16 shut off, an energy supply for the vibration drive 11 and optionally the motive drive is available, as in tunnels.

The coupling of the vibration drive 11 to the intermediate circuit 14 takes place by means of a controlled inverter 21. With this, the vibration frequency can be varied over the period of a tamping cycle. When plunging into the ballast 7, for example, the tamping tools 12 are actuated with a higher frequency. During this, the ballast 7 set in vibrations resembles a flowing medium with little penetration resistance. During squeezing, the frequency is lowered to approximately 35 Hz in order to ensure the desired stability in the consolidating ballast 7.

As visible in FIG. 3, the vibration drive 11 requires the most energy during penetration as a result of the increased frequency. The diagrams show synchronous progressions over the time 22. At the top, the progression of a penetration depth 23 of the tamping tool tips into the ballast 7 is shown. Following below that are the progressions of a forward motion speed 24 of the track maintenance machine 1 in a working direction 25, a motor performance 26 of the vibration drive 11, and a drive- or braking performance 27 of the electric machine 13. In a simplified variant, the positive drive performance 27 for forward acceleration of the track maintenance machine 1 can be covered by a separate drive.

The negative drive- or braking performance 27 is used in any case for supplying the vibration drive 11. Here, there is a temporal overlapping of the energy 28 emitted by the electric machine 13 (cross-hatched area in the diagram drive- or braking performance 27) and the energy 29 used by the vibration drive 11 (cross-hatched area in the diagram motor performance 26). As a result of this temporal overlapping, a significant part of the energy 28 given off to the intermediate circuit 14 is consumed immediately without impact on the energy store 15.

Favourably, the intermediate circuit 14 is arranged together with the energy store 15 in a central supply unit 30. The latter comprises a control unit 31 for coordinated actuation of the components 16, 17, 20, 21 coupled to the intermediate circuit 14. In this, a bus system 32 is provided for connection of the control unit 31 to the coupled components 16, 17, 20, 21.

Expediently, various sensor signals are fed to the control unit 31. Thus, by way of continuous measurement of an intermediate circuit voltage 33, the energy storage in the intermediate circuit 14 and the actuation of the coupled components 16, 17, 20, 21 is optimized. Additionally, a detecting of the sleepers 8 or rail fastening means by means of optical, capacitive or inductive sensors enables an automatized braking and tamping of a detected sleeper 8.

The invention claimed is:
1. A track maintenance machine for compaction of ballast under sleepers of a track, the track maintenance machine comprising:
a machine frame;

undercarriages for moving said machine frame on the track;

a tamping unit including tamping tools and an electric vibration drive for vibratory actuation of said tamping tools;

an electric intermediate circuit with an electric energy store, said electric intermediate circuit being coupled to said electric vibration drive for supplying said electric vibration drive with energy; and an electric machine associated with at least one of said undercarriages and coupled for generator operation to said intermediate circuit.

2. The track maintenance machine according to claim 1, wherein said electric energy store includes a super capacitor.

3. The track maintenance machine according to claim 1, wherein said electric energy store includes an accumulator.

4. The track maintenance machine according to claim 1, wherein said electric machine is a motive drive, and a bidirectional converter connects said motive drive to said intermediate circuit.

5. The track maintenance machine according to claim 1, which further comprises an inverter connecting said vibration drive to said intermediate circuit.

6. The track maintenance machine according to claim 1, wherein said vibration drive is a brushless electric motor.

7. The track maintenance machine according to claim 1, which further comprises components coupled to said intermediate circuit, and a control unit for coordinated actuation of said components.

8. The track maintenance machine according to claim 1, wherein said tamping unit is disposed on said machine frame.

9. The track maintenance machine according to claim 1, which further comprises a combustion engine-generator unit coupled to said intermediate circuit for supplying energy to said intermediate circuit.

10. The track maintenance machine according to claim 1, which further comprises converter circuitry coupled to said intermediate circuit for supplying energy to said intermediate circuit from a catenary of the track.

11. A method for operation of a track maintenance machine for compaction of ballast under sleepers of a track, the method comprising the following steps:

providing a track maintenance machine having:

a machine frame, undercarriages for moving the machine frame on the track, a tamping unit including tamping tools and an electric vibration drive for vibratory actuation of the tamping tools, an electric intermediate circuit with an electric energy store, the electric intermediate circuit being coupled to the electric vibration drive for supplying the electric vibration drive with energy, and an electric machine associated with at least one of the undercarriages and coupled for generator operation to the intermediate circuit;

using the electric machine to brake the track maintenance machine while giving off electric energy to the intermediate circuit when approaching a location of the track to be tamped; and supplying the vibration drive with electric energy from the intermediate circuit during a tamping operation.

12. The method according to claim 11, which further comprises actuating the tamping tools with a higher vibration frequency during penetration into the ballast than during a squeezing operation.

* * * * *